(12) United States Patent
Guo

(10) Patent No.: US 10,105,815 B2
(45) Date of Patent: Oct. 23, 2018

(54) MULTIAXIAL VIBRATION-PEENING SYSTEM

(71) Applicant: UNITED TECHNOLOGIES CORPORATION, Farmington, CT (US)

(72) Inventor: Changsheng Guo, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 278 days.

(21) Appl. No.: 14/492,507

(22) Filed: Sep. 22, 2014

(65) Prior Publication Data

US 2015/0114074 A1  Apr. 30, 2015

Related U.S. Application Data

(63) Continuation of application No. 61/895,311, filed on Oct. 24, 2013.

(51) Int. Cl.
  *B24B 39/00* (2006.01)
  *B23P 9/04* (2006.01)
  *C21D 7/04* (2006.01)
(52) U.S. Cl.
  CPC .............. *B24B 39/006* (2013.01); *B23P 9/04* (2013.01); *C21D 7/04* (2013.01)

(58) Field of Classification Search
  CPC ......... B24B 39/006; B24B 39/00; C21D 7/04; B23P 9/04
  See application file for complete search history.

(56) References Cited

U.S. PATENT DOCUMENTS

| | | | | |
|---|---|---|---|---|
| 7,276,824 B2 * | 10/2007 | Statnikov | .................. | B06B 3/00 310/26 |
| 7,431,779 B2 * | 10/2008 | Statnikov | .............. | B06B 1/0253 148/400 |
| 8,033,151 B2 * | 10/2011 | Castle | .................... | B21D 22/02 72/115 |
| 9,789,582 B2 * | 10/2017 | Haas | ..................... | B24B 39/006 |
| 2014/0007394 A1 * | 1/2014 | Haas | ..................... | B24B 39/006 29/90.01 |

* cited by examiner

*Primary Examiner* — Peter DungBa Vo
*Assistant Examiner* — John S Lowe
(74) *Attorney, Agent, or Firm* — Cantor Colburn LLP

(57) ABSTRACT

A method for controlled peening includes forming a surface layer on a workpiece by impacting a surface with a tool wherein the tool is under control to form compressive residual stresses in the surface layer. A system for peening a workpiece includes a tool configured to vibrate and an effector operatively connected to control the tool. The tool includes a peening surface. The tool is configured to cause controlled impact between the peening surface and a surface of a workpiece to form a surface layer of the workpiece with compressive residual stresses. The effector is configured to move the tool in multiple axes.

8 Claims, 4 Drawing Sheets

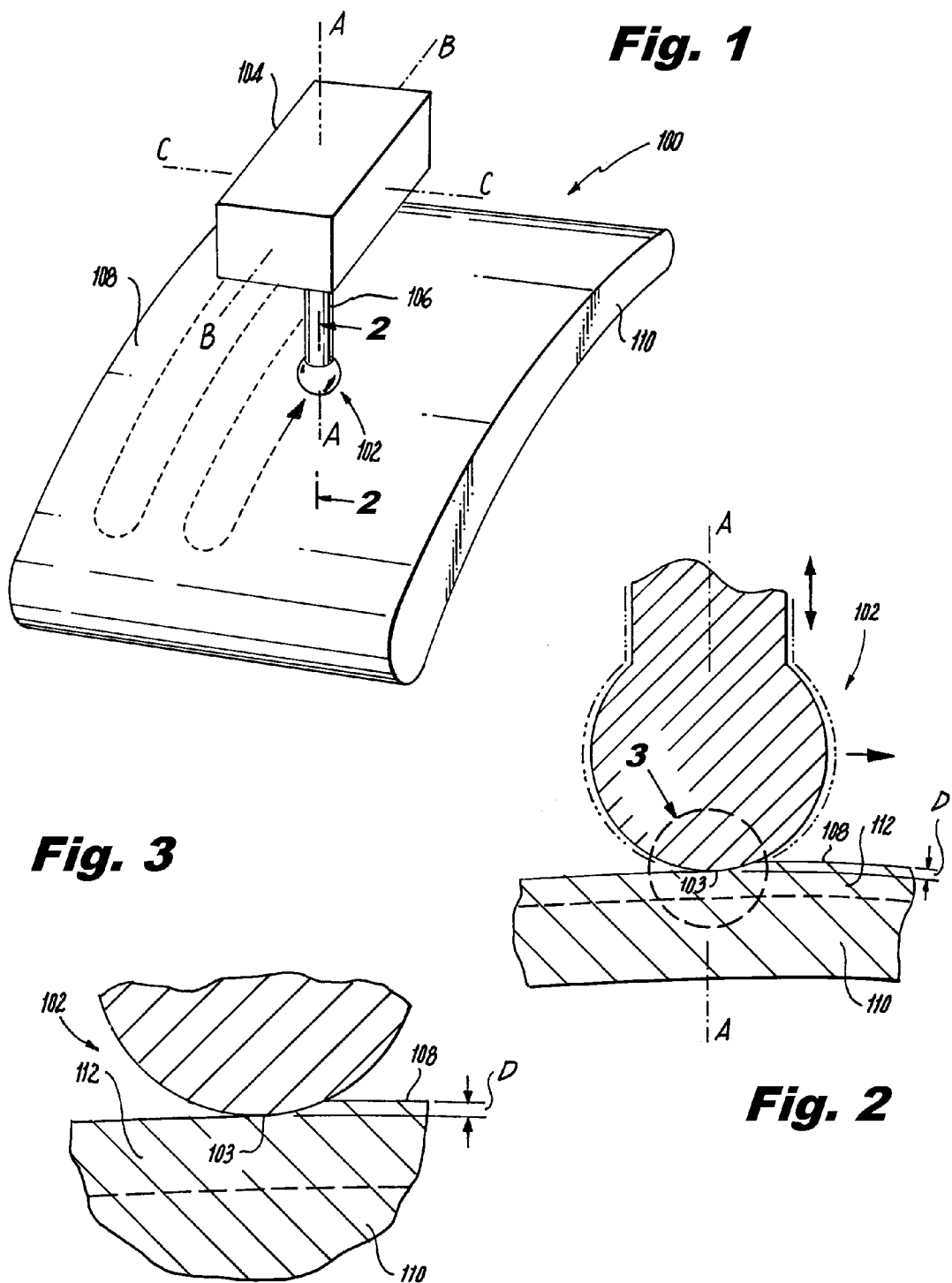

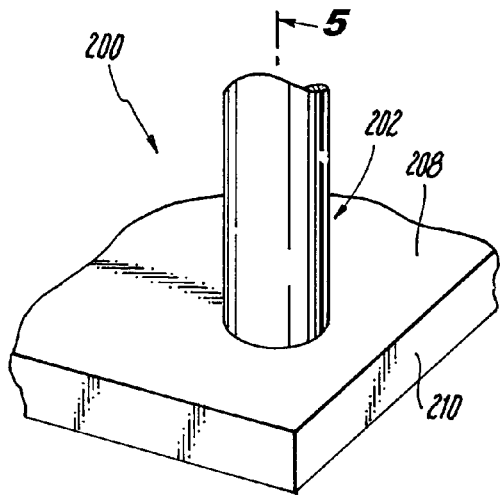
Fig. 4
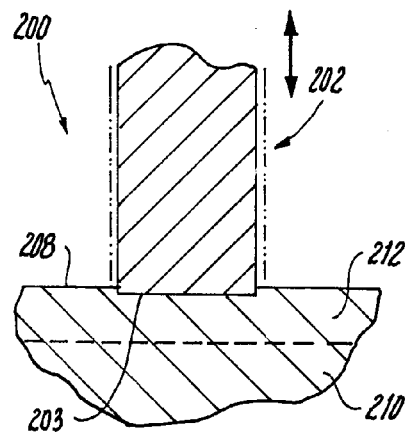
Fig. 5
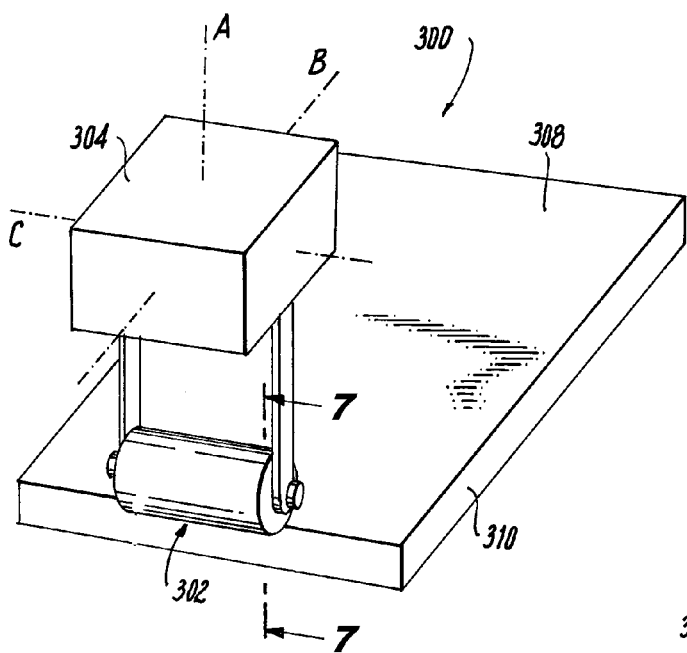
Fig. 6
Fig. 7
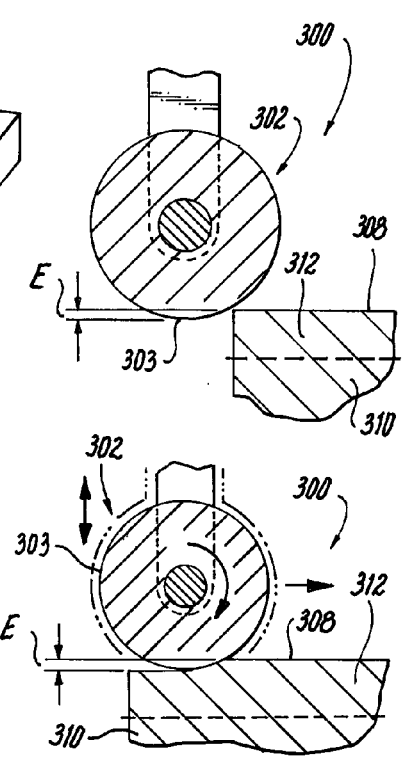
Fig. 8

MULTIAXIAL VIBRATION-PEENING SYSTEM

CROSS-REFERENCE TO RELATED APPLICATION

This application claims the benefit of priority under 35 U.S.C. § 119(e) to U.S. Provisional Application No. 61/895,311, filed Oct. 24, 2013, which is incorporated herein by reference in its entirety.

BACKGROUND OF THE INVENTION

1. Field of the Invention

The present disclosure relates to surface treatments in manufacturing, and more particularly to peening of a workpiece, e.g. an aerospace component.

2. Description of Related Art

Some aerospace components require compressive residual stress near the machined surface to improve fatigue life. Traditionally, shot peening has been used in the manufacturing process to create such compressive residual stresses. However, shot peening is a not well-controlled process. The shot impact density cannot be guaranteed to cover the entire surface and the intensity of the shot impact cannot be guaranteed to be uniform across the surface.

Such conventional methods and systems have generally been considered satisfactory for their intended purpose. However, there is still a need in the art for systems and methods that allow for improved control in the peening process. The present disclosure provides a solution for these problems.

SUMMARY OF THE INVENTION

A method for controlled peening includes forming a surface layer on a workpiece by impacting a surface with a tool wherein the tool is under control to form compressive residual stresses in the surface layer.

The method can further include providing controlled vibrational motion to the tool. The controlled vibrational motion can be configured to cause impact between the tool and the surface layer of the workpiece. Providing controlled vibrational motion to the tool can include providing controlled vibrational motion in a plane parallel and/or perpendicular to a longitudinal axis of the tool. Further, providing controlled vibrational motion to the tool can include providing controlled vibrational motion in a plane normal to the surface layer of the workpiece. Forming the surface layer can include controlling the tool based on a characteristic, such as workpiece profile, impact depth, intensity and frequency of vibration and/or magnitude of a compressive residual stress.

The method can further include aligning the tool with the workpiece at a pre-set engagement in relation to the surface of the workpiece. The pre-set engagement can position a maximum depth of the tool below the surface of the workpiece. The method can also include moving the tool transversely over the surface of the workpiece. The tool can be configured to impact the surface of the workpiece while moving across the workpiece.

A system for peening a workpiece includes a tool configured to vibrate and an effector operatively connected to control the tool. The tool includes a peening surface. The tool is configured to cause controlled impact between the peening surface and a surface of a workpiece to form a surface layer of the workpiece with compressive residual stresses. The effector is configured to move the tool in multiple axes.

The system can also include a vibration transducer operatively connected to vibrate the tool. The tool can have a shape, such as, a cylinder shape, a profiled cylinder shape, a spherical shape, and/or a frustoconical shape with a rounded tip. The vibration transducer can be configured to vibrate the tool in a plane parallel to, and/or perpendicular to a longitudinal axis of the tool. It is also contemplated that the vibration transducer can be configured to vibrate the tool in a plane normal to a surface of a workpiece.

The effector can be configured to control the tool to produce a desired characteristic, such as, a workpiece profile, an impact depth, an intensity and a frequency of vibration and/or a magnitude of a compressive residual stress. In addition, the effector can be configured to be controlled by a control system in a multi-axis machine.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of an exemplary embodiment of a system for peening a workpiece constructed in accordance with the present disclosure, showing the tool, the effector the vibrational transducer, and the workpiece;

FIG. 2 is an enlarged cross-sectional plan view of the system of FIG. 1, schematically showing the vibration of the tool and the surface layer formed in the workpiece;

FIG. 3 is an enlarged cross-sectional plan view of the system of FIG. 1, schematically showing the surface layer formed in the workpiece and the change in height of the workpiece;

FIG. 4 is a perspective view of another exemplary embodiment of a system for peening a workpiece constructed in accordance with the present disclosure, showing the tool and the workpiece;

FIG. 5 is an enlarged cross-sectional plan view of the system of FIG. 4, schematically showing the vibration of the tool and the surface layer formed in the workpiece;

FIG. 6 is a perspective view of another exemplary embodiment of a system for peening a workpiece constructed in accordance with the present disclosure, showing the tool, the effector and the workpiece;

FIG. 7 is an enlarged cross-sectional plan view of the system of FIG. 6, schematically showing the surface layer formed in the workpiece and the depth of the pre-set engagement with respect to the tool and the workpiece;

FIG. 8 is an enlarged cross-sectional plan view of the system of FIG. 6, schematically showing the vibration of the tool, the surface layer formed in the workpiece, and the change in height of the workpiece;

DETAILED DESCRIPTION OF THE PREFERRED EMBODIMENTS

Figure 9:
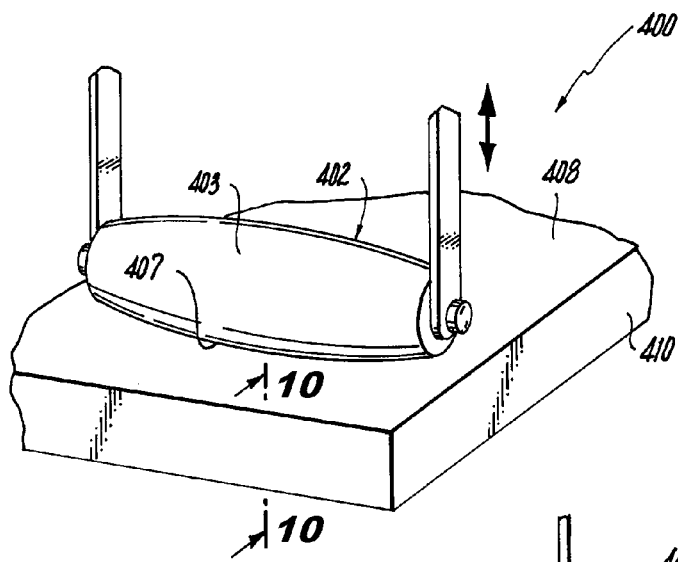
FIG. 9 is a perspective view of another exemplary embodiment of a system for peening a workpiece constructed in accordance with the present disclosure, showing the tool and the workpiece.

Reference will now be made to the drawings wherein like reference numerals identify similar structural features or aspects of the subject disclosure. For purposes of explanation and illustration, and not limitation, a partial view of an exemplary embodiment of a system for peening a workpiece in accordance with the disclosure is shown in FIG. 1 and is designated generally by reference character 100. Other embodiments of systems for peening a workpiece in accordance with the disclosure, or aspects thereof, are provided in FIGS. 2-14, as will be described. The systems and methods described herein can be used to improve peening control and consistency.

As shown in FIG. 1, a system 100 for peening a workpiece includes a tool 102 configured to vibrate and an effector 104 operatively connected to control tool 102. Tool 102 includes a peening surface 103. Tool 102 is configured to cause controlled impact between peening surface 103 and a surface 108 of a workpiece 110. Effector 104 is configured to move tool 102 in multiple axes, e.g. axes A, B and C. System 100 includes a vibration transducer 106 operatively connected to vibrate tool 102. In the depicted embodiment, tool 102 has a spherical shape. Those skilled in the art will readily appreciate that there are a variety of suitable shapes for tool 102, as will be described below.

Now with reference to FIG. 2, vibration transducer 106, not shown, is configured to vibrate tool 102 in a plane parallel to, and/or perpendicular to a longitudinal axis A of tool 102. The vibrational motion is shown schematically by the broken lines and the direction of the vibration is indicated by the double-headed arrow. The single-headed arrow indicates the transverse motion of tool 102 across workpiece 110. Further, while the vibrational motion is shown along longitudinal axis A, those skilled in the art will readily appreciate that vibration transducer 106 is also configured to vibrate tool 102 in a plane normal to surface 108 of workpiece 110. Those skilled in the art will also readily appreciate that a variety of vibration orientations can be achieved by moving workpiece 110 with respect to system 100, by moving tool 102 with respect to the workpiece 110, and/or by vibration transducer 106 modifying the direction of tool 102 vibrations.

Now with reference to FIG. 3, the controlled impact between peening surface 103 and a surface 108 of a workpiece 110 is configured to form a surface layer 112 of workpiece 110 with plastic deformation and compressive residual stresses. Those skilled in the art will appreciate that while plastic deformation and compressive residual stresses are present in surface layer 112, the actual change in height D of the workpiece due to the peening is contemplated to be less than the depth of surface layer 112. Those skilled in the art will readily appreciate that surface layer 112 and change in height D are both exaggerated throughout the drawings and that they are not to scale.

Those skilled in the art will readily appreciate that effector 104 and/or vibration transducer 106 can be configured to control tool 102 to produce a desired characteristic, such as, a workpiece profile, an impact depth, an intensity and a frequency of vibration and/or a magnitude of a compressive residual stress. Further, those skilled in the art will readily appreciate effector 104 can be controlled by a control system in a multi-axis machine, e.g. a multi-axis milling machine, or a Computer Numerical Control (CNC) machine. In addition, those skilled in the art will also readily appreciate that while vibration transducer 106 is shown schematically herein, vibration transducer 106 can be a manufacturing tool such as, vibration assisted or ultrasonic assisted machine tools, vibration assisted drilling equipment, vibration assisted turning and/or ultrasonic-assisted honing and/or grinding.

Those skilled in the art will readily appreciate that peening surface 103 and workpiece 110 engagement combined with the vibrational motion achieve compressive residual stress quicker and deeper relative to traditional peening methods or traditional roller burnishing methods. The vibrational motion tends to reduce the force required, and/or the depth of the pre-set engagement required, as compared with traditional peening or roller burnishing methods, to achieve the same compressive residual stress level, therefore allowing for smaller equipment to be used.

As shown in FIG. 4, another system 200 for peening a workpiece is shown. System 200 includes a cylindrically shaped tool 202 with a peening surface 203. System 200 is substantially similar to system 100 as described above, except for tool 202 shape. An effector, not shown, is operatively connected to control tool 202. Effector of tool 202 is similar to effector 104 is configured as described above.

Now with reference to FIG. 5, tool 202 is configured to vibrate, similar to tool 102, described above. The vibrational motion is shown schematically by the broken lines and the direction of the vibration is indicated by the double-headed arrow. Those skilled in the art will readily appreciate that a vibration transducer, similar to vibration transducer 106, can be operatively connected to vibrate tool 202. Tool 202 is configured in a similar manner to tool 102, described above, e.g. tool 202 is configured to form a surface layer 212 in a workpiece 210 by impacting the surface 208 of workpiece 210 with peening surface 203.

As shown in FIG. 6, another system 300 for peening a workpiece 310 is shown. System 300 also includes a cylindrically shaped tool 302. System 300 is substantially similar to system 100 as described above, except for the shape of tool 302. An effector 304 is operatively connected to control tool 302. Effector 304 is similar to effector 104 and is configured as described above.

Now with reference to FIG. 7, tool 302 includes a peening surface 303 and is configured in a similar manner to tool 102, described above, e.g. tool 302 is configured to form a surface layer 312 in workpiece 310 by impacting the surface 308 of workpiece 310 with peening surface 303. In contrast to tool 102, tool 302 is aligned with workpiece 310 at a pre-set engagement in relation to surface 308 of workpiece 310. The pre-set engagement positions a maximum depth E of tool 302 below surface 308 of workpiece 310. Those skilled in the art will readily appreciate that the pre-set engagement can be used to control the depth of surface layer 312, e.g. the depth of compressive residual stresses. The amount of pre-set engagement depends on material properties, such as elastic modulus and yield strength, and material flow stress, such as work hardening characteristics.

As shown in FIG. 8, tool 302 is configured to vibrate. The vibrational motion is shown schematically by the broken lines and the direction of the vibration is indicated by the double-headed arrow. The single-headed arrow indicates the transverse motion of tool 302 across workpiece 310. Maximum depth E of tool 302 corresponds to the change in height of workpiece 310. Those skilled in the art will readily appreciate that a vibration transducer, similar to vibration transducer 106, can be operatively connected to vibrate tool 302. Those skilled in the art will readily appreciate that tool 302 can also be configured to be in free rotation or controlled rotation, as indicated by the clockwise directed arrow. In controlled rotation, effector 304 can control the rotation characteristics, such as direction and/or speed.

As shown in FIG. 9, another system 400 for peening a workpiece 410 is shown. System 400 includes a tool 402 with a profiled cylinder shape 407, shown as an exaggerated profile in FIGS. 9-10. System 400 is substantially similar to systems 100 and 300 as described above, except for tool 402 shape. Tool 402 includes a peening surface 403 and is configured to vibrate. An effector 404, not shown, is operatively connected to control tool 402. Effector 404 is similar to effector 104 and is configured as described above. In both FIGS. 9 and 10, the direction of the vibration is indicated by the double-headed arrow.

Figure 10:
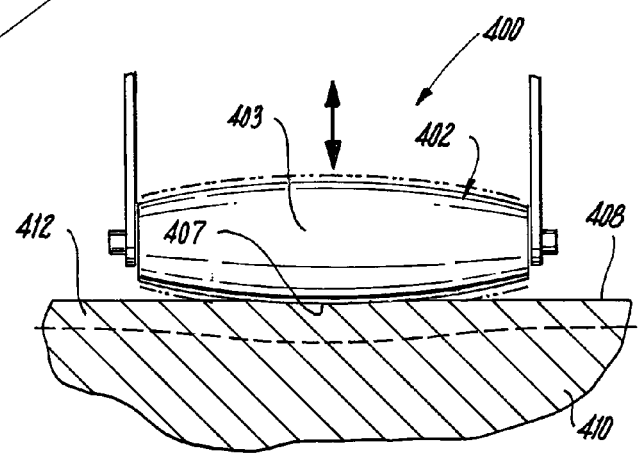
FIG. 10 is an enlarged cross-sectional plan view of the system of FIG. 9, schematically showing the vibration of the tool and the surface layer formed in the workpiece.

Now with reference to FIG. 10, profiled cylinder shape 407 is configured to provide varying degrees of plastic deformation and compressive stresses when impacting surface 408, as shown by the varying surface layer 412. Those skilled in the art will readily appreciate that surface layer 412 formed by impact with surface 408 of workpiece 410 might vary due to profiled cylinder shape 407. Those skilled in the art will readily appreciate that a vibration transducer, similar to vibration transducer 106, can be operatively connected to vibrate tool 402. The vibrational motion is shown schematically by the broken lines. Tool 402 is configured in a similar manner to tool 102, described above, e.g. tool 402 is configured to form a surface layer 412 in a workpiece 410 by impacting the surface 408 of workpiece 410 with peening surface 403. Those skilled in the art will readily appreciate that tool 402 can also be configured to be in free rotation or controlled rotation, similar to the rotation described above with respect to tool 302.

Figure 11:
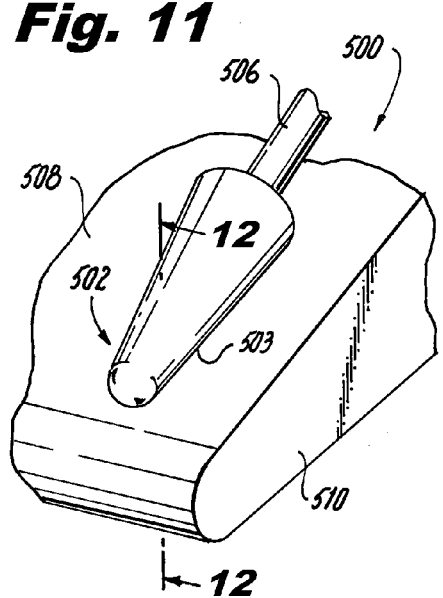
FIG. 11 is a perspective view of another exemplary embodiment of a system for peening a workpiece constructed in accordance with the present disclosure, showing the tool and the workpiece.

As shown in FIG. 11, another system 500 for peening a workpiece 510 is shown. System 500 includes a tool 502 with a frustoconical shape with a rounded tip. System 500 is substantially similar to system 100 as described above, except for tool 502 shape.

Figure 12:
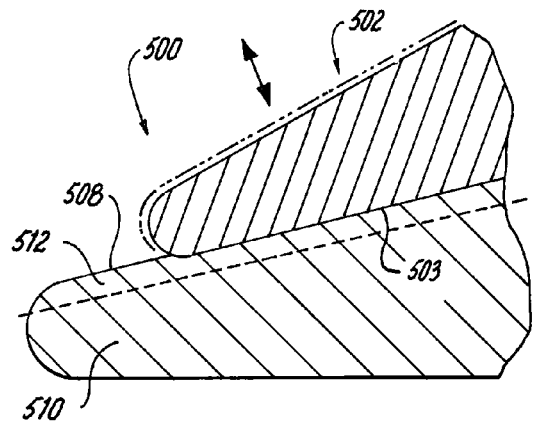
FIG. 12 is an enlarged cross-sectional plan view of the system of FIG. 11, schematically showing the vibration of the tool and the surface layer formed in the workpiece.

Now with reference to FIG. 12, tool 502 includes a peening surface 503 and is configured to vibrate. An effector 504, not shown, is operatively connected to control tool 502. The vibrational motion is shown schematically by the broken lines and the direction of the vibration is indicated by the double-headed arrow. Effector 504 is similar to effector 104 and is configured as described above. A vibration transducer 506, similar to vibration transducer 106, is operatively connected to vibrate tool 502. Tool 502 is configured in a similar manner to tool 102, described above, e.g. tool 502 is configured to form a surface layer 512 in workpiece 510 by impacting a surface 508 of workpiece 510 with peening surface 503.

Figure 13:
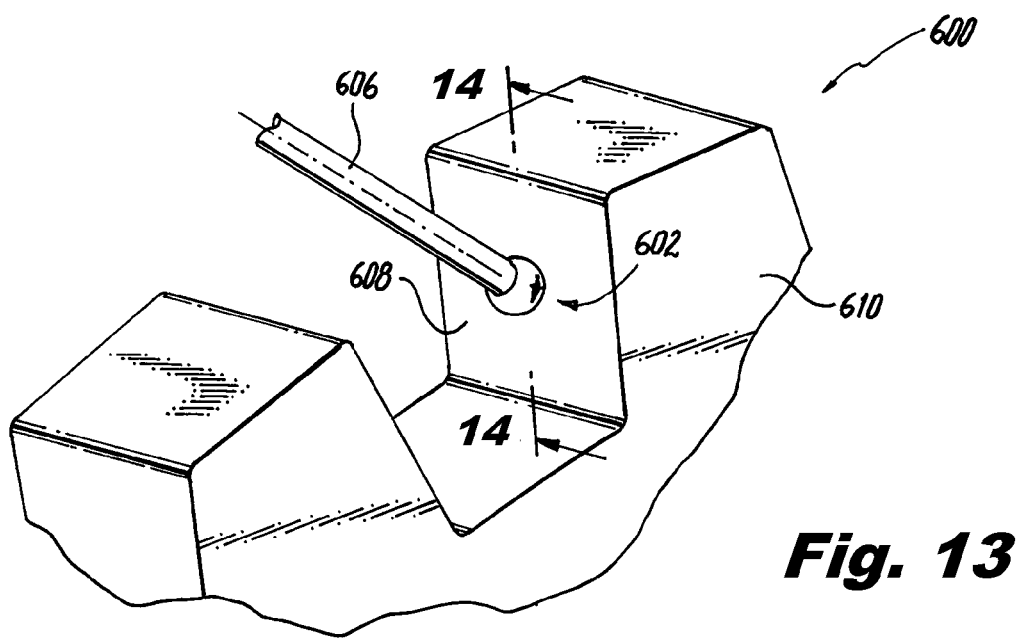
FIG. 13 is a perspective view of another exemplary embodiment of a system for peening a workpiece constructed in accordance with the present disclosure, showing the tool and the workpiece.

As shown in FIG. 13, another system 600 for peening a workpiece 610 is shown. System 600 includes a tool 602, substantially similar to tool 102, as described above. System 600 is substantially similar to system 100 as described above, except for workpiece 610. Workpiece 610 is shown as gear teeth. An effector 604, not shown, is operatively connected to control tool 602. Effector 604 is similar to effector 104 and is configured as described above.

Figure 14:
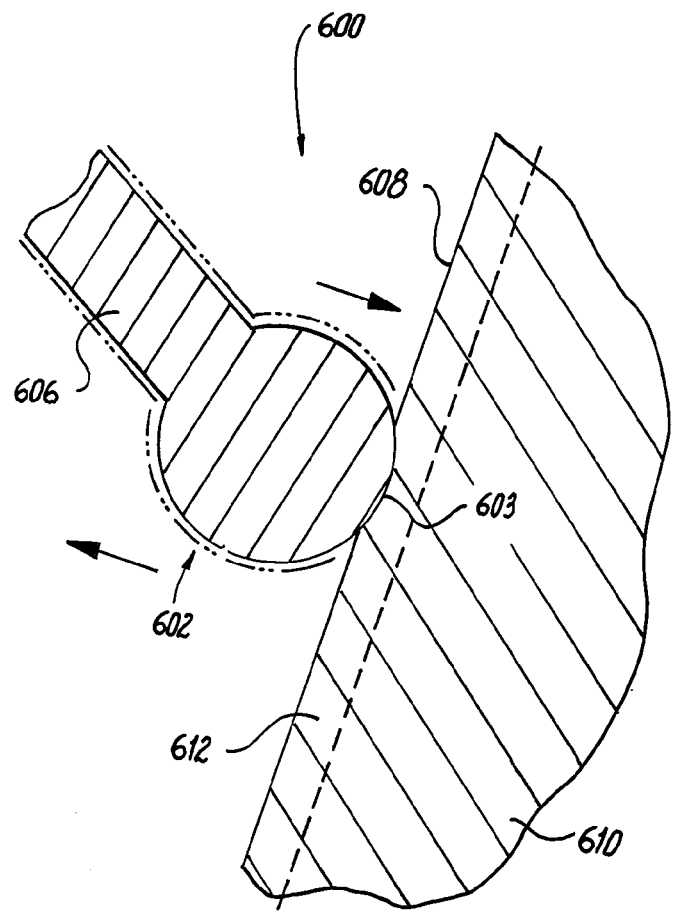
FIG. 14 is an enlarged cross-sectional plan view of the system of FIG. 13, schematically showing the vibration of the tool and the surface layer formed in the workpiece.

Now with reference to FIG. 14, tool 602 is configured to vibrate normal to surface 608 of workpiece 610. The vibrational motion is shown schematically by the broken lines and the direction of the vibration is indicated by the single-headed arrows. A vibration transducer 606, similar to vibration transducer 106, is operatively connected to vibrate tool 602. Tool 602 has a peening surface 603 and is configured in a similar manner to tool 102, described above, e.g. tool 602 is configured to form a surface layer 612 in a workpiece 610 by impacting a surface 608 of workpiece 610 with peening surface 603. Those skilled in the art will readily appreciate that vibrations from vibration transducer 606, are configured to provide a controlled peen to surface 608, a surface that is traditionally difficult provide a controlled peen to.

Now with reference to FIGS. 1-3, a method for controlled peening includes forming surface layer 112 on workpiece 110 with plastic deformation and compressive residual stresses by impacting surface layer 112 with tool 102 wherein tool 102 is under control. The method includes providing controlled vibrational motion, illustrated schematically, to tool 102. The controlled vibrational motion is configured to cause impact between peening surface 103 of tool 102 and surface layer 112 of workpiece 110. It is contemplated that providing controlled vibrational motion to tool 102 can include providing controlled vibrational motion in a plane parallel and/or perpendicular to a longitudinal axis A of tool 102. Further, it is also contemplated that providing controlled vibrational motion to tool 102 can include providing controlled vibrational motion in a plane normal to surface layer 112 of workpiece 110. Those skilled in the art will readily appreciate that forming surface layer 112 can include controlling tool 102 based on characteristics, such as, workpiece profile, impact depth, intensity and frequency of vibration and/or magnitude of compressive residual stress. The method includes moving tool 102 transversely over surface 108 of workpiece 110, shown schematically by scanning lines in FIG. 1. In other words, peening surface 103 of tool 102 is configured to impact surface 108 of workpiece 110, as described above, while moving across workpiece 110. Those skilled in the art will readily appreciate that a single tool 102 can provide multiple impacts to workpiece 110 to create surface layer 112.

Now with reference to FIGS. 6-8, those skilled in the art will readily appreciate that the method can include aligning tool 302 with workpiece 310 at a pre-set engagement in relation to surface 308 of workpiece 310. The pre-set engagement positions a maximum depth E of tool 302 below surface 308 of workpiece 310. Those skilled in the art will readily appreciate that the pre-set engagement can be used to control the depth of surface layer 312, as described above. The amount of pre-set engagement depends on material properties and material flow stress, as described above.

Those skilled in the art will readily appreciate that the controlled motion of a tool, e.g. tool 102, 202, 302, 402, 502 and 602, over a surface, e.g. surface 108, 208, 308, 408, 508 and 608, provides improved consistency and control in the peening process as compared to the traditional peening process. Further, those skilled in the art will readily appreciate that the tool motion over 3-D curved surface, e.g. surface 108, can be controlled by existing multi-axis machine. It is contemplated that the peening can be done on the same machine where the surface of a workpeice, e.g. workpiece 110, 210, 310, 410, 510 and 610, is finished. Those skilled in the art will readily appreciate that this can eliminate post process and reduce costs. Further, while various tool shapes were shown and described herein, those skilled in the art will readily appreciate that any suitable tool geometry for a specific application can be used to accommodate the geometry of the workpiece. It is contemplated that due to the multi-axis vibrational motion and tool geometry this controlled peening method is suitable for complex geometries such as an airfoil, turbine disks, turbine slots, and gear surfaces.

The methods and systems of the present disclosure, as described above and shown in the drawings, provide for improved peening control and consistency. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A system for peening a surface of a workpiece, the system comprising:
    a multi-axis machine supporting the workpiece;
    an effector operatively connected to the machine and capable of being positioned relative to the surface of the workpiece, wherein during peening the effector linearly translates in three mutually perpendicular axes relative to the surface of the workpiece including a longitudinal axis that is normal to, and intersects, the surface of the workpiece to provide longitudinal motion along the longitudinal axis and transverse motion over and/or across the surface of the workpiece;
    a transducer operatively connected to the effector, disposed between the effector and the surface of the workpiece, and extending along the longitudinal axis, wherein during peening the transducer translates along the longitudinal axis with the effector and vibrates in a plane parallel to and/or perpendicular to the longitudinal axis; and
    a tool, the tool being a vibrating tool connected to the transducer, disposed between the transducer and the surface of the workpiece, the tool being a single peening surface disposed on the longitudinal axis of said tool that faces the surface of the workpiece,
    wherein the tool is:
    an elongated cylindrical tool having a central axis, an outer cylindrical surface disposed about the central axis, and opposing axial ends, the tool being rotationally supported on the opposing axial ends so that when peening the tool rotates about the central axis and the outer cylindrical surface of the tool impacts the surface of the workpiece, and
    wherein when peening, the tool translates along with the effector and transducer, vibrates with the transducer and engages the surface of the workpiece to cause a controlled impact to the surface of the workpiece and form:
    a first layer of plastic deformation having a first depth E below the surface of the workpiece, and
    a second layer of a compressive residual stress having a second depth below the surface of the workpiece, the second depth being a pre-set depth that depends on material properties and material flow stress of the workpiece, and
    the first depth E being less than the second depth.

2. A system as recited in claim 1, wherein the effector controls the tool to produce a desired characteristic, selected from the group consisting of a workpiece profile, an impact depth, an intensity of vibration, a frequency of vibration and a magnitude of a compressive residual stress.

3. The system of claim 1, wherein the material properties include elastic modulus and the material flow stress includes work hardening characteristics.

4. The system of claim 1, wherein the material properties include yield strength.

5. A system for peening a surface of a workpiece, the system comprising:
    a multi-axis machine supporting the workpiece;
    an effector operatively connected to the machine and capable of being positioned relative to the surface of the workpiece, wherein during peening the effector linearly translates in three mutually perpendicular axes relative to the surface of the workpiece including a longitudinal axis that is normal to, and intersects, the surface of the workpiece to provide longitudinal motion along the longitudinal axis and transverse motion over and/or across the surface of the workpiece;
    a transducer operatively connected to the effector, disposed between the effector and the surface of the workpiece, and extending along the longitudinal axis, wherein during peening the transducer translates along the longitudinal axis with the effector and vibrates in a plane parallel to and/or perpendicular to the longitudinal axis; and
    a tool, the tool being a vibrating tool connected to the transducer, disposed between the transducer and the surface of the workpiece, the tool being a single peening surface disposed on the longitudinal axis of said tool that faces the surface of the workpiece,
    wherein the tool is:
    a frustoconical tool having a central axis, a tip at a first axial end of the tool and a base at a second axial end of the tool and an outer conical surface extending along the central axis between the tip and the base, wherein the transducer connects to the base of the frustoconical tool along the central axis and the transducer extends way from the base along the central axis, so that when penning the outer conical surface of the frustoconical tool impacts the surface of the workpiece, and
    wherein when peening, the tool translates along with the effector and transducer, vibrates with the transducer and engages the surface of the workpiece to cause a controlled impact to the surface of the workpiece and form:
    a first layer of plastic deformation having a first depth D below the surface of the workpiece, and
    a second layer of compressive residual stress having a second depth below the surface of the workpiece, the second depth being a pre-set depth that depends on material properties and material flow stress of the workpiece, and
    the first depth D being less than the second depth.

6. A system as recited in claim 5, wherein the effector controls the tool to produce a desired characteristic, selected from the group consisting of a workpiece profile, an impact depth, an intensity of vibration, a frequency of vibration and a magnitude of a compressive residual stress.

7. The system of claim 5, wherein the material properties include elastic modulus and the material flow stress includes work hardening characteristics.

8. The system of claim 5, wherein the material properties include yield strength.

\* \* \* \* \*